US009582426B2

(12) United States Patent
Galbraith et al.

(10) Patent No.: US 9,582,426 B2
(45) Date of Patent: Feb. 28, 2017

(54) HARDWARE MANAGED COMPRESSED CACHE

(71) Applicant: International Business Machines Corporation, Armonk, NY (US)

(72) Inventors: Robert Galbraith, Rochester, MN (US); Adrian C. Gerhard, Rochester, MN (US); Daniel F. Moertl, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 472 days.

(21) Appl. No.: 13/970,817

(22) Filed: Aug. 20, 2013

(65) Prior Publication Data
US 2015/0058576 A1 Feb. 26, 2015

(51) Int. Cl.
| G06F 12/00 | (2006.01) |
| G06F 13/00 | (2006.01) |
| G06F 13/28 | (2006.01) |
| G06F 12/08 | (2016.01) |
| G06F 12/12 | (2016.01) |

(52) U.S. Cl.
CPC ...... *G06F 12/0871* (2013.01); *G06F 12/0886* (2013.01); *G06F 12/12* (2013.01); *G06F 2212/401* (2013.01); *G06F 2212/6042* (2013.01); *G06F 2212/69* (2013.01)

(58) Field of Classification Search
CPC .. G06F 12/0871; G06F 12/12; G06F 12/0886; G06F 2212/401; G06F 2212/6042; G06F 2212/69

USPC ........................................................ 711/133
See application file for complete search history.

(56) References Cited

U.S. PATENT DOCUMENTS

| 5,194,995 | A | * | 3/1993 | Severtson | ............... G11B 5/008 360/48 |
| 5,796,978 | A | * | 8/1998 | Yoshioka | ............ G06F 12/1027 711/206 |
| 6,125,399 | A | * | 9/2000 | Hamilton | ................ H04L 29/06 370/392 |
| 6,195,024 | B1 | * | 2/2001 | Fallon | ....................... G06T 9/00 341/51 |

(Continued)

FOREIGN PATENT DOCUMENTS

| CN | 101246452 A | 8/2008 |
| CN | 105474186 A | 4/2016 |

(Continued)

OTHER PUBLICATIONS

European Extended Search Report, Application EP14837679 dated Aug. 24, 2016.

*Primary Examiner* — Sheng-Jen Tsai
(74) *Attorney, Agent, or Firm* — Patterson + Sheridan, LLP

(57) ABSTRACT

A computing element, system, and method for implementing control structures for a compressed cache in hardware. Embodiments provide a first engine configured to allocate and deallocate virtual memory pages and physical memory pages from pools of available pages to store received data to the compressed cache, a second engine configured to compress received data and store the compressed data. Embodiments also provide for embedding data within the virtual and physical memory pages to indicate page size, type, and data compression.

17 Claims, 6 Drawing Sheets

(56) References Cited

U.S. PATENT DOCUMENTS

| | | | |
|---|---|---|---|
| 6,877,081 B2* | 4/2005 | Herger | G06F 12/08 710/56 |
| 7,162,584 B2 | 1/2007 | Adl-Tabatabai et al. | |
| 7,430,638 B2* | 9/2008 | Kellar | G06F 12/0862 707/999.101 |
| 7,710,425 B1* | 5/2010 | Baldwin | G06T 1/60 345/538 |
| 8,139,073 B1* | 3/2012 | Van Dyke | H03M 7/30 345/535 |
| 2003/0191876 A1* | 10/2003 | Fallon | G06F 3/0613 710/68 |
| 2005/0144387 A1* | 6/2005 | Adl-Tabatabai | G06F 12/0862 711/118 |
| 2007/0085714 A1* | 4/2007 | Levy | H03M 7/30 341/51 |
| 2008/0162871 A1* | 7/2008 | Strader | G06F 17/30958 712/7 |
| 2009/0144496 A1 | 6/2009 | Kawaguchi | |
| 2009/0150611 A1 | 6/2009 | Fortin et al. | |
| 2009/0198902 A1* | 8/2009 | Khmelnitsky | G06F 12/0246 711/135 |
| 2010/0138614 A1* | 6/2010 | Glasco | G06F 12/0875 711/144 |
| 2010/0306498 A1 | 12/2010 | Shiga | |
| 2011/0022819 A1* | 1/2011 | Post | G06F 12/0246 711/207 |
| 2011/0072235 A1* | 3/2011 | Deming | G06F 12/1027 711/207 |
| 2011/0191553 A1 | 8/2011 | Yamauchi | |
| 2011/0225342 A1* | 9/2011 | Sharma | G06F 12/08 711/6 |
| 2012/0203993 A1* | 8/2012 | Virgin | G06F 12/0246 711/165 |
| 2013/0042064 A1* | 2/2013 | Simionescu | G06F 12/0871 711/118 |
| 2013/0185508 A1* | 7/2013 | Talagala | G06F 12/0888 711/118 |
| 2014/0331013 A1* | 11/2014 | Ishii | G06F 12/084 711/145 |
| 2015/0100736 A1 | 4/2015 | Galbraith et al. | |
| 2015/0106557 A1* | 4/2015 | Yu | G06F 3/0608 711/103 |
| 2015/0248366 A1* | 9/2015 | Bergsten | H04L 67/1097 710/308 |

FOREIGN PATENT DOCUMENTS

| | | |
|---|---|---|
| EP | 3036642 A1 | 6/2016 |
| WO | 2015024504 A1 | 2/2015 |

* cited by examiner

HARDWARE MANAGED COMPRESSED CACHE

BACKGROUND

The present invention relates to data storage adapters, and more specifically, to the hardware implementation of write caches in data storage adapters.

Storage adapters and storage subsystems often include a write cache to improve performance. The write cache may typically be implemented using a relatively fast non-volatile memory (e.g., using a Flash-backed DRAM). Write caches may be used to mitigate performance penalties on write operations, such as the intensive parity calculations required in certain configurations of redundant arrays of independent disks ("RAID"), such as RAID 5 and RAID 6. A write cache can also improve storage performance by consolidating multiple host operations placed in the write cache into a single destage operation, which may be processed more economically by the RAID layer and the disk devices.

The effective size of write caches has grown dramatically over time, due to both an increase in the size of memory chips as well as through the use of compression techniques to compress the data contents of the write cache. At the same time, faster storage devices such as Solid-State Drives (SSDs) have become increasingly popular, which increases the overall throughout required of the storage adapter, and correspondingly increases the computational demands to keep up with the attached drives.

SUMMARY

Embodiments of the invention generally related to a controller and a system for implementing control structures for a compressed cache in hardware, thereby improving the performance of the storage system.

Embodiments provide a computing element for managing a compressed cache, comprising a first hardware engine configured to allocate a first number of virtual memory pages and a first number of physical memory pages in order to store received data to the compressed cache, a second hardware engine configured to compress the received data and store the compressed data, wherein the first hardware engine is further configured to deallocate one or more physical memory pages not used to store the compressed data.

Embodiments provide a data storage system comprising a host system, one or more storage devices, and a storage adapter coupled to the host system and to the one or more storage devices, the storage adapter comprising a first hardware engine configured to allocate a first number of virtual memory pages and a first number of physical memory pages in order to store received data to the compressed cache, a second hardware engine configured to compress the received data and store the compressed data, wherein the first hardware engine is further configured to deallocate one or more physical memory pages not used to store the compressed data.

Embodiments provide a method for managing a compressed cache, in which a first hardware engine, upon receiving a size of data to be stored to the compressed cache, allocates virtual memory pages and physical memory pages, the received data is compressed and stored into the physical memory pages, and the first hardware engine deallocates physical memory pages not used to store the compressed data.

BRIEF DESCRIPTION OF THE SEVERAL VIEWS OF THE DRAWINGS

So that the manner in which the above recited aspects can be understood in detail, a more particular description of embodiments of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In order to improve the performance of storage adapters and storage systems, functionality may be added to the storage adapters (or to components thereof) by implementing control structures for a compressed cache directly in hardware. This may include, for example, compression and decompression functions, and may also include managing the allocation and deallocation of the memory resources (virtual and physical) required to maintain a compressed cache.

Figure 1A:
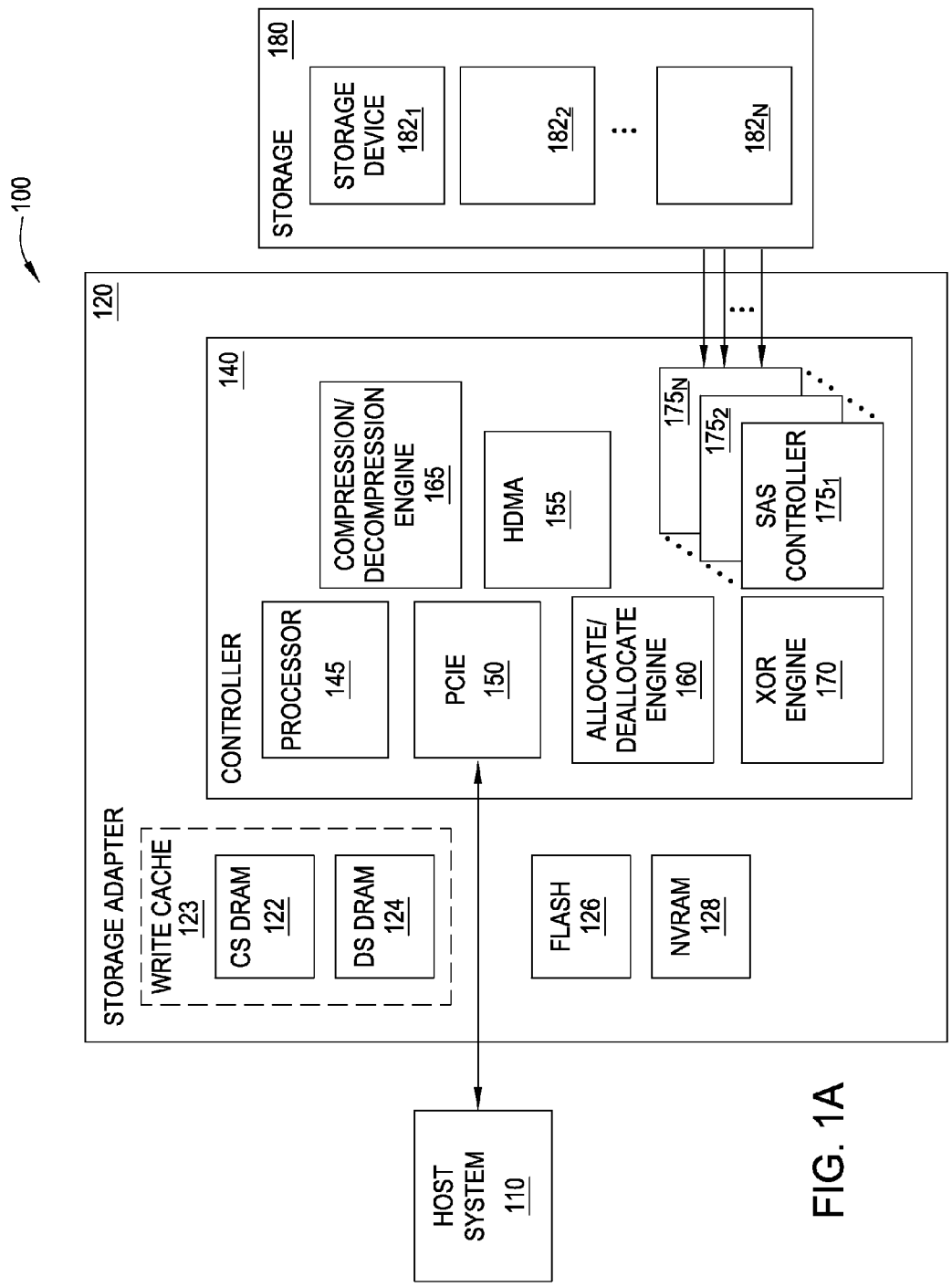
FIG. 1A is a block diagram illustrating an exemplary storage system, according to embodiments described herein.

FIG. 1A illustrates an exemplary storage system 100, according to embodiments described herein. Storage system 100 includes a host system 110, a storage adapter 120, and storage 180. Host system 110 may be connected to the controller 140 of storage adapter 120 through any connection suitable to meet the throughput requirements of the storage adapter 120; in the example shown, host system 110 is connected to storage adapter 120 through a Peripheral Component Interconnect Express (PCIe) interface 150.

Storage adapter 120 is generally configured to transfer data between the host system 110 and storage 180, and may utilize any feasible technology for doing so. Storage adapter 120 may include memory for a control store (CS) 122 and a data store (DS) 124, which provide the control storage and data storage for the write cache 123. The memory used for the CS 122 and DS 124 is shown as dynamic random-access memory (DRAM) but may be any other feasible type of memory. Storage adapter 120 may also include several additional types of memory, such as flash memory 126 and non-volatile random-access memory (NVRAM) 128.

Storage adapter 120 includes a controller 140, which includes a processor 145. Processor 145 is intended to be representative of a single processor, multiple processors, a single CPU having multiple processing cores, and the like. While processor 145 is shown as integrated into controller 140, in an alternative embodiment, the processor may be located elsewhere within the storage adapter 120 and communicatively coupled to the controller 140 through a suitable high speed interconnect, such as a PCIe connection.

Controller 140 may further include several engines implemented in hardware that are used in executing data storage and write cache operations, according to embodiments described herein. As shown, controller 140 includes at least a host Direct Memory Access (HDMA) engine 155, an allocate/deallocate engine 160, one or more compression/decompression engines 165, and an XOR engine 170 (which may provide parity calculations for storage operations). Controller 140 may include one or more serial attached SCSI (SAS) controllers $175_{1-N}$, providing one or more data connections between the controller 140 and the storage 180.

The engines may be implemented as separate computing elements, or in alternative embodiments, functions of two or more engines may be combined into one computing element. In other embodiments, one or more of the engines described above may reside elsewhere within the storage adapter, or all of the engines may reside outside of the storage adapter.

Storage 180 includes one or more storage devices $182_{1-N}$. Storage devices $182_{1-N}$ may include hard disk drives, solid-state drives, or any other suitable storage devices, and may include combinations of different types of storage devices (e.g., one or more hard disk drives and one or more solid-state drives). Storage 180 may be a peripheral device of the host system 110, and alternately or additionally may be coupled to one or more other computer systems.

Figure 1B:
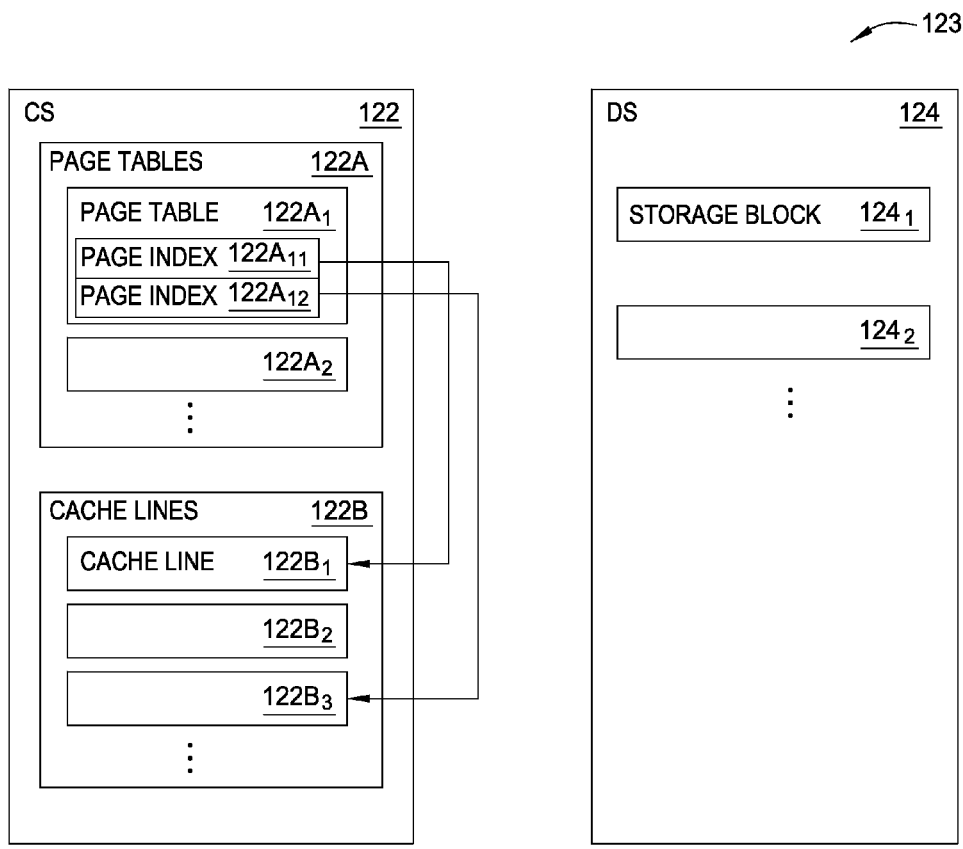
FIGS. 1B and 1C are block diagrams illustrating the logical structure of an exemplary write cache within a storage system, according to embodiments described herein.

FIG. 1B further illustrates the structure of write cache 123, which includes at least CS 122 and DS 124. The CS 122 provides storage for the control structures and additional information associated with the data stored in DS 124. CS 122 may include a page table structure 122A (shown as $122A_{1,2}$) where each page table has one or more page indexes, as well as a cache line structure 122B having one or more cache lines (shown as $122B_{1-3}$). DS 124 may generally be divided into one or more storage blocks (shown as $124_{1,2}$) of a predetermined size, or may vary in size. In one embodiment, DS 124 is divided into storage blocks of a uniform, predetermined size.

In one embodiment, page table structure 122A contains a plurality of page indexes, each page index corresponding to one or more cache lines and containing one or more indexes pointing to the one or more cache lines. The page indexes contained in the page tables may be used in scatter-gather lists for direct memory access (DMA) operations. As an example, page table $122A_1$ is shown as having two page indexes, with page index $122A_{11}$ corresponding to cache line $122B_1$ and page index $122A_{12}$ corresponding to $122B_3$.

Figure 1C:
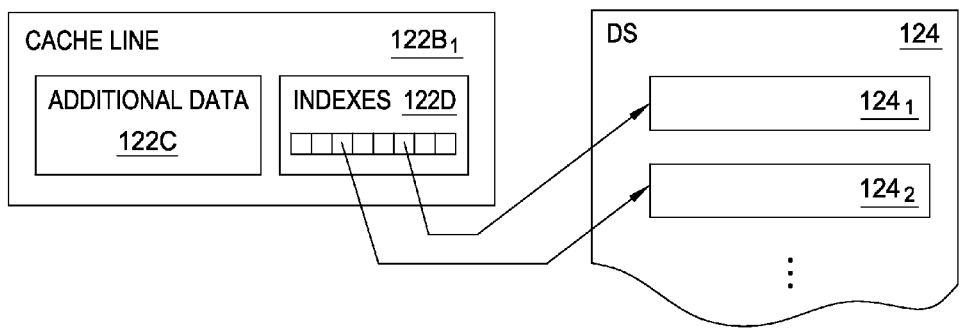

In turn, FIG. 1C illustrates the logical relationship between individual cache lines 122B and the storage blocks of DS 124. As shown, cache line $122B_1$ contains one or more indexes 122D and may contain additional data 122C. Each index 122D may point to a respective storage block in DS 124. As shown, one index corresponds to storage block $124_1$ and another index to $124_2$.

For ease of reading and comprehension, certain virtual and physical memory page sizes will be used consistently throughout this application. However, these example page sizes are not intended to limit the scope of the invention, and alternate embodiments may use page sizes differing from those described herein. Physical memory pages will generally be described as 528 bytes (528 B) in size. The 528 B size is one size commonly used in modern data storage adapters and systems. In one embodiment, the 528 B pages may include an 8-byte header, 512 bytes of data, and an 8-byte trailer. Additionally, the virtual memory pages will generally be described as 4224 bytes (4K), which is selected to correspond in a fixed ratio to the number of physical memory pages (i.e., eight 528 B physical pages to one 4K virtual page).

Indexes, such as those contained in page table 122A and cache lines 122B, and are used to distinguish and uniquely identify each of the 4K and 528 B pages of virtual and physical memory. In one example, the indexes 122D stored in the cache line structure may describe where the data resides in physical memory. Additionally, the index values may be used within the virtual and physical memory pools, described in greater detail below. In multiple embodiments, each index 122D is a fixed size (e.g., four bytes) and is arranged so that a predetermined number of leading bits of the index may indicate the size and type of page being described. In one embodiment, an index value of "0xCnnn _nnnn" (where n represents a placeholder and values for each n may vary) indicates a 4K virtual memory page, while an index value of "0xEnnn _nnnn" indicates a 528 B physical memory page.

In one embodiment, each cache line 122B within the write cache 123 can store eight indexes 122D, each index 122D pointing to a 528 B physical memory page stored in DS 124; thus, each cache line 122B corresponds to 4K of stored data in DS 124. Because each cache line 122B in this example is defined as corresponding to the same size (i.e., 4K) as each virtual memory page, each cache line 122B may correspond directly to an allocated virtual memory page in a 1:1 ratio. If compression is not enabled in the write cache 123, the 4K of stored data represented virtually in one cache line 122B corresponds to 4K of physical memory in DS 124 (i.e., eight 528 B physical memory pages). However, if compression is enabled, the indexes 122D in a cache line 122B may point to fewer than eight 528 B physical memory pages stored in DS 124. Thus, the number of physical pages indexed by any given cache line 122B will vary based on the level of data compression.

Data values may be included in physical memory pages to indicate whether the data stored within the page is compressed. In multiple embodiments, the 8-byte headers within the 528 B physical memory pages may each include a predetermined data value or pattern at a predetermined location. This predetermined data value or pattern may be distinct or unique; ideally this data value or pattern will never be used or written by the host system, thus ensuring that whenever the data value or pattern is encountered in the header, the data value or pattern reliably indicates the compression state of the data.

Figure 2:
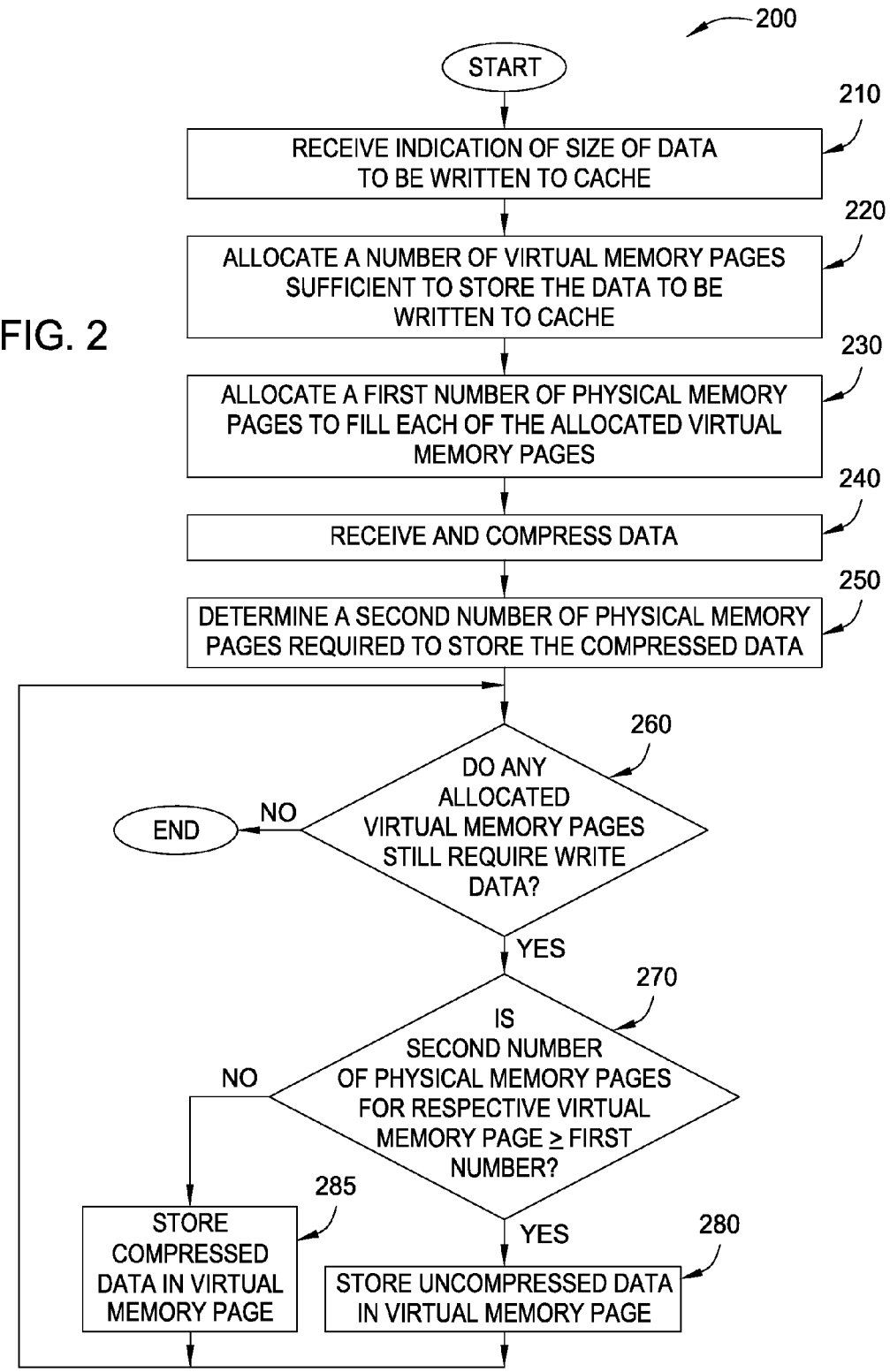
FIG. 2 is a block diagram illustrating a storage operation using a compressed write cache, according to embodiments described herein.

For ease of comprehension, FIG. 2, which describes an operation 200 using a compressed write cache, and FIG. 3, which illustrates an example of the operation 200, will be discussed concurrently.

The operation 200 begins at block 210, where the controller receives an indication from the host system of a size of data to be written to the cache. For purposes of the FIG. 3 example, and as described above, the virtual memory pages are 4K in size and the physical memory pages are 528 B. In this example, host system 110 indicates that it will write 8K of data to the cache.

Based on the size indicated, at block 220 the allocation/deallocation engine may allocate a number of virtual memory pages sufficient to store the data to be written to the cache. This may be a simple calculation, in which the size of the data is divided by the size of the virtual memory pages (e.g., 4K).

In multiple embodiments, the allocation/deallocation engine may maintain pools 330 and 340 for available virtual memory pages and for available physical memory pages. Each pool 330, 340 may comprise a list of available indexes for the respective type of memory pages. Each pool comprises a head pointer 331, 341 and tail pointer 332, 342, which the allocation/deallocation engine updates whenever indexes are allocated from or deallocated into the pool during operation of the storage adapter.

Figure 3:
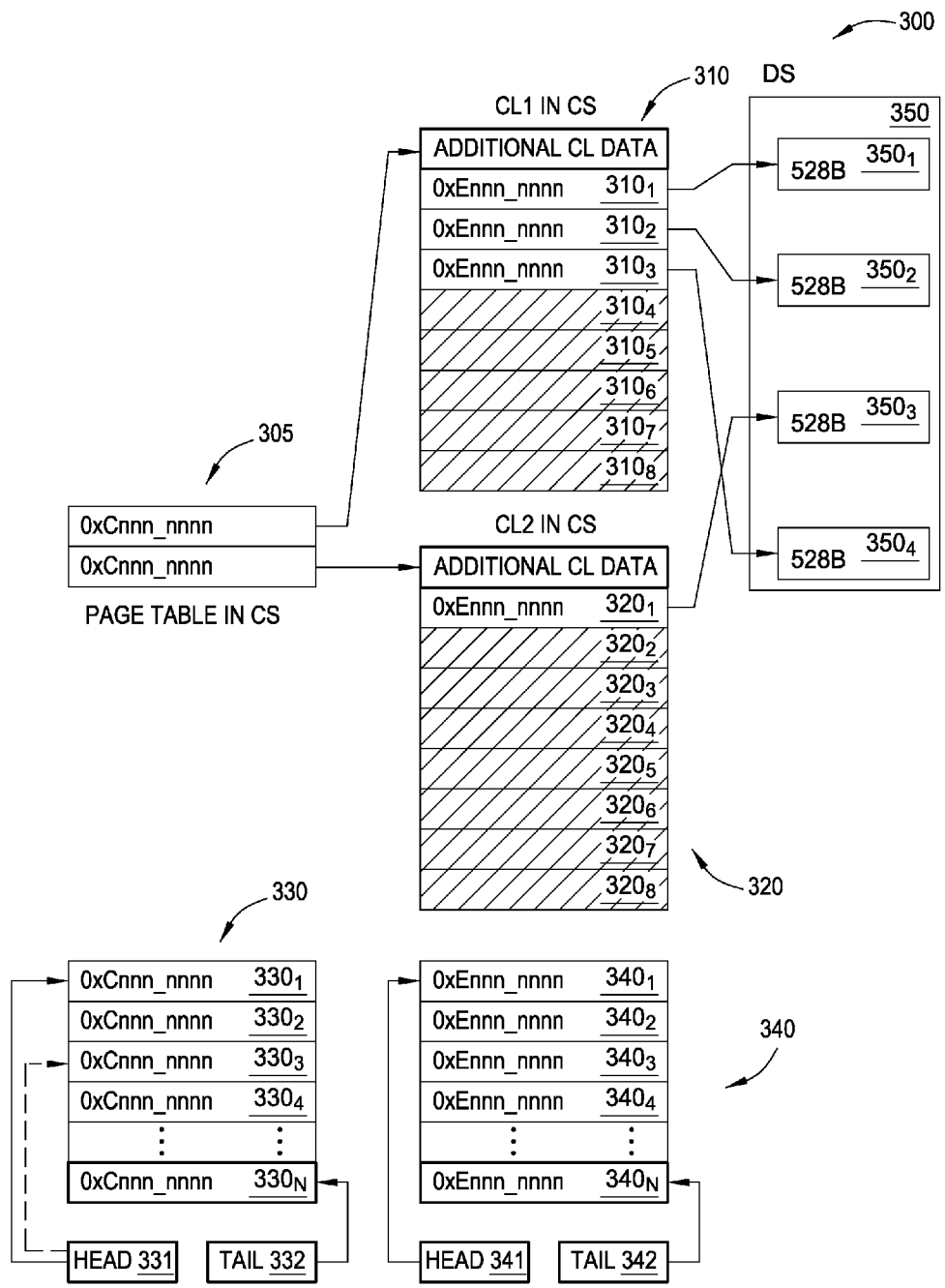
FIG. 3 illustrates an example operation using a compressed write cache, according to embodiments described herein.

In the FIG. 3 example, allocation/deallocation engine allocates two 4K virtual memory pages into page table 305, which will be sufficient to store the 8K of incoming data. Each allocated virtual memory page has a 4-byte index, whose value is "0xCnnn_nnnn ", indicating the page is virtual memory and 4K-sized (as described above). The allocation/deallocation engine allocates the first two available virtual memory pages $330_{1,2}$ from the virtual memory pool 330, updating the head pointer 331 to point to the next available virtual memory page $330_3$.

At block 230, the allocation/deallocation engine may allocate a number of physical memory pages to fill each of the allocated virtual memory pages. As described above, this may be defined as a fixed ratio (e.g., eight 528 B physical pages to one 4K virtual page). Based on this allocation of physical and virtual memory pages, the allocated virtual memory pages are capable of storing all the indicated incoming data even for the worst-case scenario (where the data cannot be compressed and must be stored uncompressed). As shown in FIG. 3, allocation/deallocation engine then allocates eight 528 B physical memory pages for each of the two allocated virtual memory pages into cache lines CL1 310 and CL2 320, for a total of sixteen 528 B physical memory pages. Each allocated physical memory page has a 4-byte index, whose value of "0xEnnn_nnnn" indicates that the page is physical memory and 528 B-sized. Allocation/deallocation engine allocates the first sixteen available physical memory pages (i.e., pages $340_{1-16}$) from the physical memory pool 340, updating the head pointer 341 to point to the next available physical memory page (i.e., page $340_{17}$). At this point, the combination of the two cache lines CL1 and CL2 can store the full 8K of incoming data, uncompressed, in physical memory.

At block 240, the one or more compression/decompression engines receive the data from host system, and compress the received data according to any number of techniques. To compress the received data, the data may be sent to the compression/decompression engines as a series of data chunks (in this example, the size of each chunk is set at 4K). Standardized or well-known sizes for the data chunks (like 4K) may be used; otherwise an additional step of dividing the received data into discrete sections may be required prior to compression. As shown in FIG. 3, the compression/decompression engine receives 8K of data from the host system and compresses the data. For example, the 8K of data may be sent to one compression/decompression engine in two separate 4K chunks, which compresses the two chunks individually or the 8K of data may alternately be separated into 4K chunks and sent to multiple engines to be compressed concurrently. As shown, the first 4K chunk of data indexed by the first cache line (CL1) was compressed from eight physical memory pages down to three by the compression/decompression engine while the second 4K chunk of data referenced by the second cache line (CL2) was compressed down to one physical memory page.

At block 250, the results of the compression on the received data are analyzed by determining a second number of physical memory pages into which the compressed data may be stored. Specifically, the second number of physical memory pages corresponds to the number of physical memory pages needed to store the compressed data. Thus, in FIG. 3, eight pages are allocated to the first chunk but only three pages (i.e., the second number of physical memory pages) are needed if the compressed data is stored in DS 350. For example, only three indexes in CL1 (which are stored at cache lines $310_{1-3}$) are needed to reference the compressed chunk. Thus, instead of the original eight allocated memory pages, the cache lines needs only three in physical memory pages 359 in DS 350. Furthermore, because the second chunk was compressed from eight to one physical memory page, only one index in CL2 (which is stored at cache line $320_1$) is needed to store the compressed chunk.

At block 260, the controller determines whether any of the allocated virtual memory pages remain that have not yet stored a respective portion of the received data. If one or more of these allocated virtual memory pages remain, the operation proceeds to block 270, where the controller determines whether the second number of physical memory pages required to store the compressed respective portion of data is greater than or equal to the originally allocated number (i.e., eight) of physical memory pages. If the compressed portion of data requires fewer physical memory pages (i.e., one to seven), the operation branches to block 285, where the compressed data is stored in the virtual memory page. Otherwise, the operation branches to block 280 and the uncompressed data is stored in the virtual memory page. As shown in FIG. 3, because for each of the two example cache lines the data was compressed into fewer physical memory pages than the eight pages initially allocated, the compression/decompression engine will select and store the compressed data into the write cache, depicted as memory locations $350_{1-4}$ of DS 350 where each memory location 350 is referenced by a respective index stored in the cache lines 310 and 320.

Blocks 280 and 285 both loop back to decision block 260, and the process generally repeats until there are no longer any allocated virtual memory pages that still require data to be stored, at which time operation 200 ends.

Beyond choosing to store data as compressed or uncompressed based on the results of the data compression, one or more embodiments may require data to be stored uncompressed under certain conditions. Example conditions may include when the incoming data is smaller than the size required by the compression/decompression engine to perform compression (e.g., less than a 4K chunk).

Because not all of the initially allocated physical memory pages were needed to store the compressed data, the allocation/deallocation engine may deallocate those unused physical memory pages ($314_{4-8}$ and $320_{2-8}$), returning them to physical memory pool 340 immediately following the last available physical memory page $340_N$. The allocation/deallocation engine will also update the tail pointer 342 to point past the last page of the physical memory pages returned to the pool, to indicate the next location where pages may be deallocated. In turn, the indexes stored in the virtual pages (i.e., the cache lines) which correspond to the returned physical memory pages are zeroed.

Figure 4:
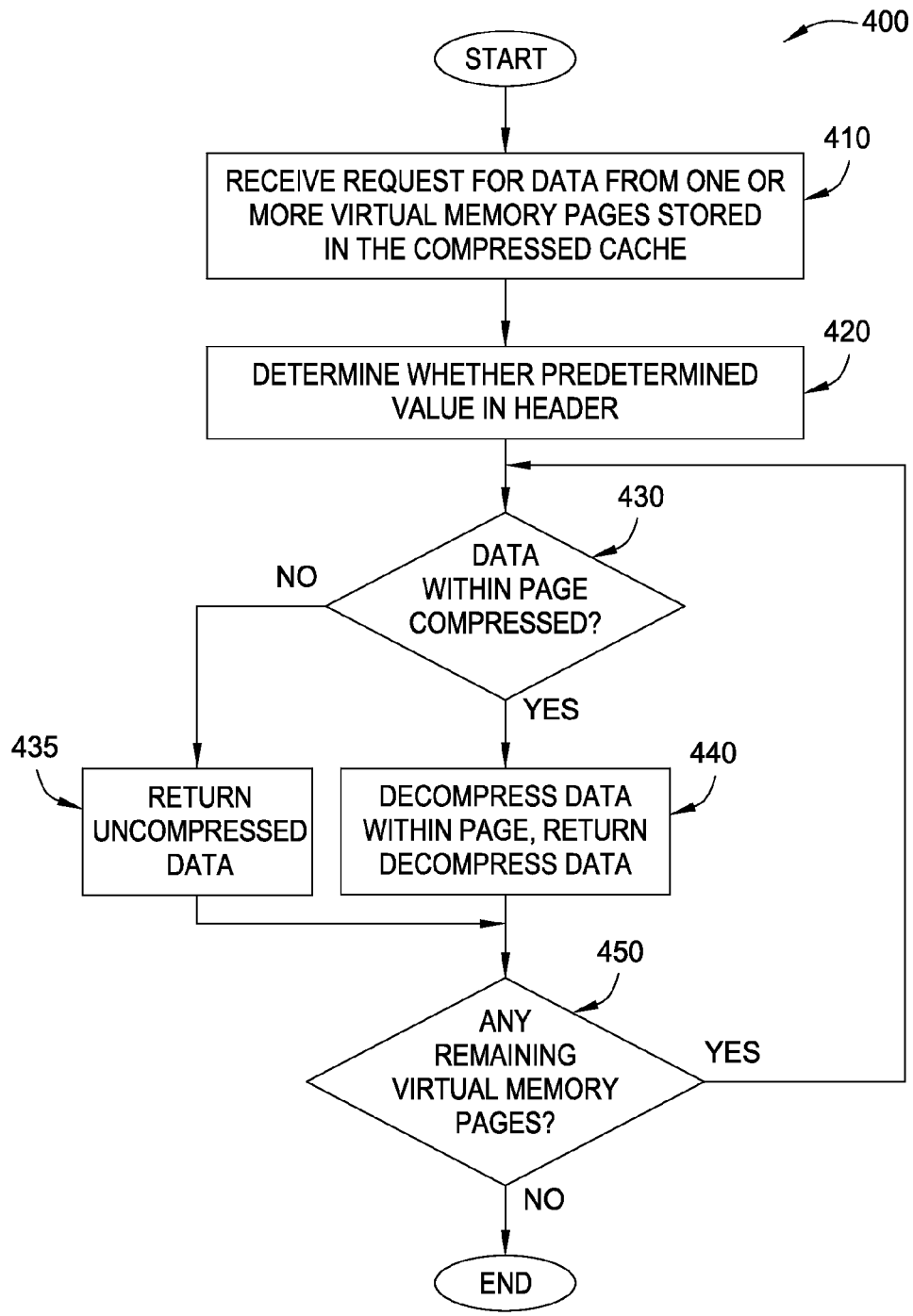
FIG. 4 is a block diagram illustrating a decompression operation using a compressed write cache, according to embodiments described herein.

FIG. 4 is a block diagram illustrating a decompression operation using a compressed write cache, according to embodiments described herein. The operation 400 begins at block 410, where controller 140 receives a request for data from one or more virtual memory pages stored in the compressed cache. Such a request for data may comprise a request for a data transfer from the write cache 123 to the host system 110 (e.g., a fast read operation), or may comprise a destage operation from the write cache 123 to one or more storage devices 182 (e.g., hard disk drives or SSDs).

At block 420, the compression/decompression engine 165 determines, for each of the one or more virtual memory pages, whether the headers of the physical memory pages contain the predetermined value in the predetermined location, thereby indicating the physical memory page contains compressed data. If at block 430, it is determined that one or more physical memory pages contain compressed data, the operation branches to block 440, where the compression/decompression engine 165 decompresses the compressed data contained in the one or more physical memory pages. In an alternative embodiment, the decompression may be accomplished using one or more of the SAS controllers $175_{1-N}$ just prior to writing out the decompressed data to one or more of the storage devices $182_{1-N}$.

If the physical memory pages do not contain compressed data, however, the operation branches to block 435, where the uncompressed data is returned from the physical memory pages. Blocks 435 and 440 both link to block 450, where it is determined whether any of the one or more virtual memory pages still remain to be read in order to fulfill the data request. If any virtual memory pages remain to be read, block 450 loops back to block 430; else, the operation 400 ends.

Figure 5:
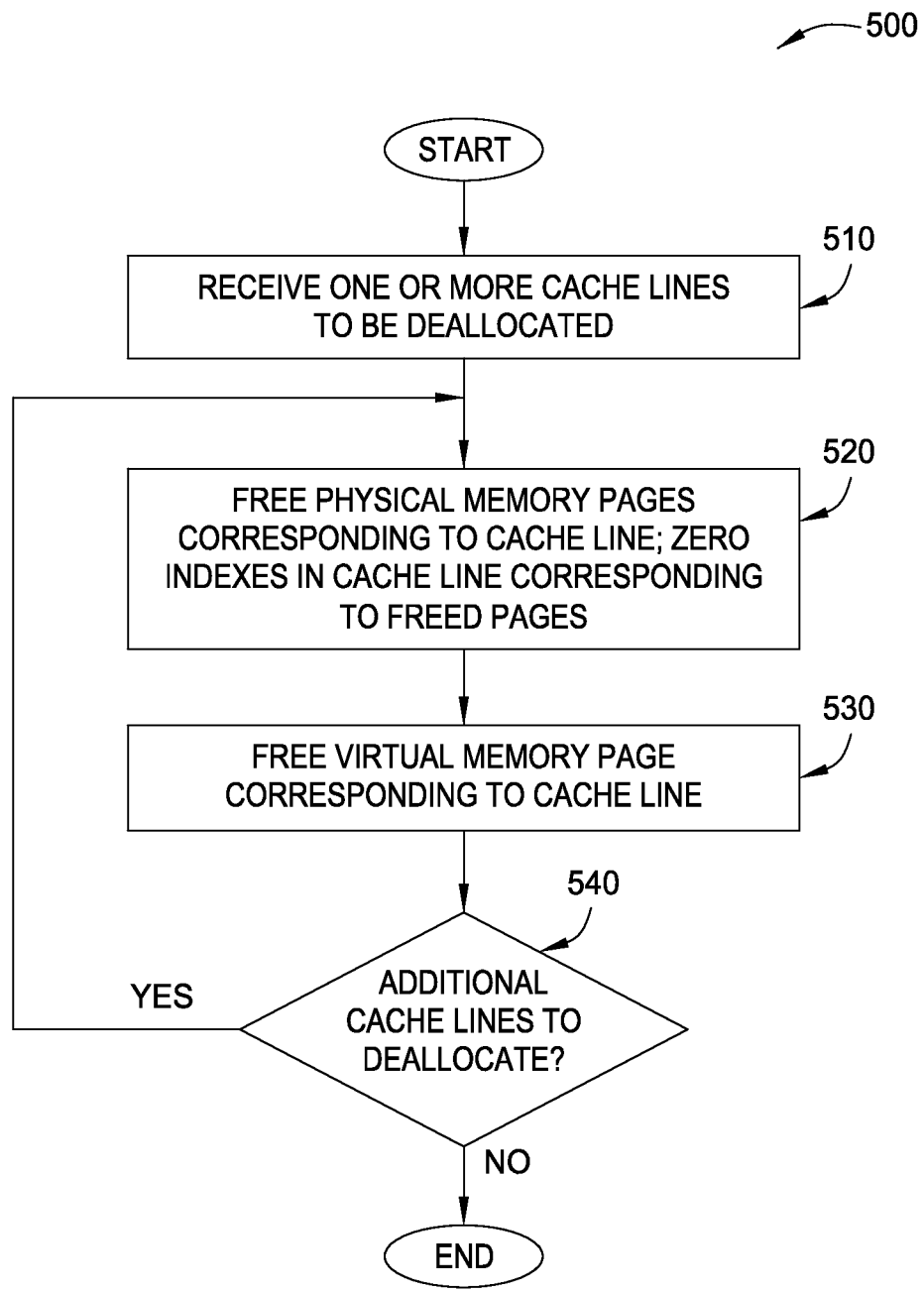
FIG. 5 is a block diagram illustrating a deallocation operation using a compressed write cache, according to embodiments described herein.

FIG. 5 is a block diagram illustrating a deallocation operation using a compressed write cache, according to embodiments described herein. For example, operation 500 may be used to deallocate cache lines after a destage operation, when the data has been copied from the write cache to one or more storage devices 182, and the data no longer needs to be maintained in the write cache.

Operation 500 begins at block 510, where allocation/deallocation engine 160 of controller 140 receives one or more cache lines to be deallocated. At block 520, the allocation/deallocation engine frees the physical memory pages corresponding to one of the one or more cache lines. This may be done by returning each of the physical memory pages to the end of physical memory pool 340, and correspondingly updating the tail pointer 342 to point past the last of the physical memory pages returned to the pool (indicating the next location where pages may be deallocated). The allocation/deallocation engine 160 may also zero out each of the 4-byte indexes in the cache line that had pointed to the physical memory pages. At block 530, allocation/deallocation engine 160 may free the virtual memory page corresponding to the cache line, returning the virtual memory page to the end of virtual memory pool 330, and correspondingly updating the tail pointer 332 to point past the virtual memory page returned to the pool. At block 540, allocation/deallocation engine 160 may determine whether there are any additional cache lines to deallocate. If additional cache lines remain, the operation branches back to block 520, and the process generally repeats until there are no additional cache lines to deallocate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computing element for managing a compressed cache, the computing element comprising:
   a first hardware engine configured to:
      upon receiving a size of data to be stored to the compressed cache, allocate a first number of virtual memory pages sufficient to store the data; and
      allocate a first number of physical memory pages to fill the first number of virtual memory pages;
   a second hardware engine configured to compress the data and store the compressed data into a second number of physical memory pages,
   wherein the first hardware engine is further configured to deallocate one or more physical memory pages of the first number of physical memory pages not used to store the compressed data,
   wherein each page of the virtual memory pages and physical memory pages corresponds to a respective index stored in the memory cache, and wherein each index is of a common size and comprises a predetermined number of leading bits that collectively indicate a size and a type of the corresponding page, wherein the type represents whether the corresponding page comprises virtual memory or physical memory.

2. The computing element of claim 1, wherein the first hardware engine and second hardware engine are included within one of a controller and a storage adapter.

3. The computing element of claim 1, wherein the first number of virtual memory pages are allocated from a pool of available virtual memory pages, wherein the first hardware engine is further configured to maintain the pool of available virtual memory pages.

4. The computing element of claim 3, wherein the first number of physical memory pages are allocated from a pool of available physical memory pages, wherein the first hardware engine is further configured to maintain the pool of available physical memory pages.

5. The computing element of claim 4, wherein maintaining the pool of available virtual memory pages and maintaining the pool of available physical memory pages comprises maintaining a head pointer and a tail pointer for each pool.

6. The computing element of claim 1, wherein each of the allocated physical memory pages comprises a respective header, and wherein the second hardware engine is further configured to write a predetermined value at a predetermined location in each header to indicate whether data stored in the respective physical memory page is compressed.

7. The computing element of claim 1, wherein the first hardware engine is further configured to deallocate one or more virtual memory pages.

8. The computing element of claim 6, wherein the second hardware engine is further configured to, upon receiving a request for data from one or more virtual memory pages stored in the compressed cache:
   determine, for each of the one or more virtual memory pages, whether data stored in the virtual memory page is compressed by reading the predetermined value at the predetermined location of the respective header;
   decompressing compressed data stored in the one or more virtual memory pages; and
   returning the requested data by providing uncompressed data from the one or more virtual memory pages and the decompressed data.

9. A data storage system, comprising:
   a host system;
   one or more storage devices; and
   a storage adapter coupled to the host system and to the one or more storage devices, the storage adapter comprising:
      a first hardware engine configured to:
         upon receiving data to be stored to the compressed cache, allocate a first number of virtual memory pages sufficient to store the received data; and allocate a first number of physical memory pages to fill the first number of virtual memory pages;

a second hardware engine configured to compress the received data and store the compressed data into a second number of physical memory pages, wherein the first hardware engine is further configured to deallocate one or more physical memory pages of the first number of physical memory pages not used to store the compressed data, wherein each page of the virtual memory pages and physical memory pages corresponds to a respective index stored in the memory cache, and wherein each index is of a common size and comprises a predetermined number of leading bits that collectively indicate a size and a type of the corresponding page, wherein the type represents whether the corresponding page comprises virtual memory or physical memory.

10. The system of claim 9, wherein the first number of virtual memory pages are allocated from a pool of available virtual memory pages, wherein the first hardware engine is further configured to maintain the pool of available virtual memory pages.

11. The system of claim 10, wherein the first number of physical memory pages are allocated from a pool of available physical memory pages, wherein the first hardware engine is further configured to maintain the pool of available physical memory pages.

12. The system of claim 11, wherein maintaining the pool of available virtual memory pages and maintaining the pool of available physical memory pages comprises maintaining a head pointer and a tail pointer for each pool.

13. The system of claim 9, wherein each of the allocated physical memory pages comprises a respective header, and wherein the second hardware engine is further configured to write a predetermined value at a predetermined location in each header to indicate whether data stored in the respective physical memory page is compressed.

14. The system of claim 9, wherein the first hardware engine is further configured to deallocate one or more virtual memory pages.

15. The system of claim 13, wherein the second hardware engine is further configured to, upon receiving a request for data from one or more virtual memory pages stored in the compressed cache:

determine, for each of the one or more virtual memory pages, whether data stored in the virtual memory page is compressed by reading the predetermined value at the predetermined location of the respective header;

decompressing compressed data stored in the one or more virtual memory pages; and returning the requested data by providing uncompressed data from the one or more virtual memory pages and the decompressed data.

16. The computing element of claim 1, wherein the predetermined number of leading bits of each index is four leading bits.

17. The system of claim 9, wherein the predetermined number of leading bits of each index is four leading bits.

* * * * *